United States Patent [19]
Lee et al.

[11] Patent Number: 5,964,326
[45] Date of Patent: Oct. 12, 1999

[54] APPARATUS FOR BLEEDING AND REFILLING HYDRAULIC BRAKE SYSTEM

[76] Inventors: Kin Bong Lee; Steven K. Lee, both of 1024 Corby Ave., Santa Rosa, Calif. 95407-6107

[21] Appl. No.: 09/040,512

[22] Filed: Mar. 17, 1998

[51] Int. Cl.$^6$ ................................................. B60T 11/30
[52] U.S. Cl. .......................................... 188/352; 60/584
[58] Field of Search ............................. 188/352; 60/584, 60/327, 453; 141/98, 231

[56] References Cited

U.S. PATENT DOCUMENTS

| | | | |
|---|---|---|---|
| 2,295,539 | 9/1942 | Beach | 188/352 |
| 4,017,329 | 4/1977 | Larson | 188/352 |
| 4,124,045 | 11/1978 | Slywka . | |
| 4,174,615 | 11/1979 | Kuhn | 188/352 |
| 4,385,909 | 5/1983 | Starr . | |
| 4,415,071 | 11/1983 | Butler | 188/352 |
| 4,418,803 | 12/1983 | Chichester | 188/352 |
| 4,842,107 | 6/1989 | Buchanan et al. | 188/352 |
| 5,060,703 | 10/1991 | Koerner | 188/352 |
| 5,410,881 | 5/1995 | Ellis | 188/352 |
| 5,438,420 | 8/1995 | Harwick et al. . | |
| 5,497,864 | 3/1996 | Oien | 188/352 |
| 5,555,919 | 9/1996 | Lipp | 188/352 |
| 5,641,003 | 6/1997 | Rey et al. | 188/352 |
| 5,653,316 | 8/1997 | Kane | 188/352 |
| 5,687,566 | 11/1997 | Petty | 60/327 |
| 5,746,259 | 5/1998 | Noble III | 141/98 |

Primary Examiner—Douglas C. Butler

[57] ABSTRACT

Apparatus for bleeding and refilling hydraulic brake system, particularly, automotive hydraulic brake system, includes a bleeding unit and a refilling unit. The bleeding unit comprises a peristaltic pump having an inlet and an outlet tubing for removing brake fluid and entrapped air in a hydraulic system. A collection container is provided for holding the brake fluid removed. A first electronic timer operates the pump for a predetermined length of time. An opto-sensor attached to the inlet tubing serves as an air bubble detector, on each air bubble detected, a signal is issued to start a second electronic timer which operates the pump for an additional predetermined length of time simultaneously with the first timer. When the first timer almost reaches resetting, each air bubbles detected, thereafter, will trigger the second timer to operate the pump until no more air bubbles are detected. The output signal from the opto-sensor also activates a LED and an electronic beeper to indicate the presence of each air bubble. A bleeder valve adapter is provided for preventing air leak past the threads of the bleeder valve during bleeding. The refilling unit includes a peristaltic pump having an inlet and an outlet tubing for delivering new brake fluid to a master cylinder reservoir. An electronic timer operates the pump for a predetermined length of time so as to prime the refilling unit before refilling. A first capacitive proximity sensor serving as a fluid level controller is clamped together with the outlet tubing to the master cylinder reservoir by a reservoir clamp. A second capacitive proximity sensor serving as a flow detector is attached to the inlet tubing. When flow interruption such as air or low new brake fluid level is detected, the second capacitive proximity sensor outputs a signal to light a LED and to activate an electronic beeper to indicate flow interruption. A LED controlled by the first capacitive proximity sensor is used to indicate the new brake fluid level in the master cylinder reservoir during bleeding. A collection container is provided for holding the brake fluid removed during priming of the refilling unit.

1 Claim, 8 Drawing Sheets

FIG. 3   FIG. 3A

APPARATUS FOR BLEEDING AND REFILLING HYDRAULIC BRAKE SYSTEM

BACKGROUND—FIELD OF INVENTION

This invention relates to bleeding and refilling hydraulic brake system, particularly relates to automotive hydraulic brake system.

BACKGROUND—DESCRIPTION OF PRIOR ART

Entrapped air and foreign contaminants could impede the performance of hydraulic systems, particularly, the hydraulic brake systems of motor vehicles. Many methods and systems have been created for bleeding air entrapped in automotive hydraulic brake systems, ranging from gravity bleeding, one or two person systems using brake pedal or hand-operated vacuum pumps to create pressure and suction, to replacing standard bleeder valves with check valves.

Furthermore, many methods and devices have also been created for refilling brake fluid in master cylinder reservoirs, such as: refilling manually, refilling by gravity, pressure and by vacuum means.

Recently, inventors created several different types of apparatuses for bleeding and refilling automotive hydraulic brake systems.

U.S. Pat. No. 4,415,071 to Butler (1983) and U.S. Pat. No. 5,487,864 to Oien (1996) disclose complex bleeding apparatuses consisting of many mechanical parts which are complex and costly to manufacture, and many steps are required to operate these apparatuses.

U.S. Pat. No. 5,410,881 to Ellis (1995) reviews a device which requires manual operation of the brake pedal to create the necessary suction and a special adapter to fit the master cylinder reservoir.

Most of the automotive hydraulic bleeding and refilling devices have certain disadvantages:

a) Simple one person system is inconvenient and inefficient.

b) Systems that require two operators are inconvenient and costly in terms of man hours.

c) Many systems suffer from air leakage past the threads of the bleeder valve rendering the system inefficient and in some cases unusable.

d) Systems use pressure bleeding could be dangerous and special tools are needed for different vehicles.

e) Some systems require different adapters to fit different master cylinder reservoirs, this would be inconvenient and expensive.

f) Most bleeding systems require the operator to stay in a certain position to monitor the air bubbles being removed by looking at the plastic tubing attached to the bleeder valve during bleeding. In most cases, the operator could not distinguish between air bubbles entrapped in or from leakage somewhere in the system, furthermore, it is unreliable to conclude that the system is completely bled just by noticing clean brake fluid flows out of the system.

OBJECTS AND ADVANTAGES

Objects and advantages of the present invention are:

a) To provide a fully self-contained, fully automatic bleeding and refilling system for hydraulic brake systems, particularly, automotive hydraulic brake systems.

b) To provide a system which does not operate under pressure, does not require compressed air and manual operation of the brake pedal to create pressure and suction.

c) To provide a system which is small in size, light weight and can be moved conveniently around the work area.

d) To provide a system which is extremely easy to use, extremely quiet in operation, low power consumption and environmentally safe.

e) To provide a system which is durable, easy to maintain and repair.

f) To provide a system which requires only one operator and the operator can see and hear clearly the air bubbles being removed so that the operator is free to continue other preparations.

Further objects and advantages will become apparent from a consideration of the ensuing description and drawings.

BRIEF DESCRIPTION OF THE DRAWINGS

FIG. 3 is a plan view of the bleeder valve adapter.

FIG. 3A is a sectional view of the bleeder valve adapter showing the axial passageway.

REFERENCE NUMERALS IN DRAWINGS: THE BLEEDING UNIT

Figure 1:
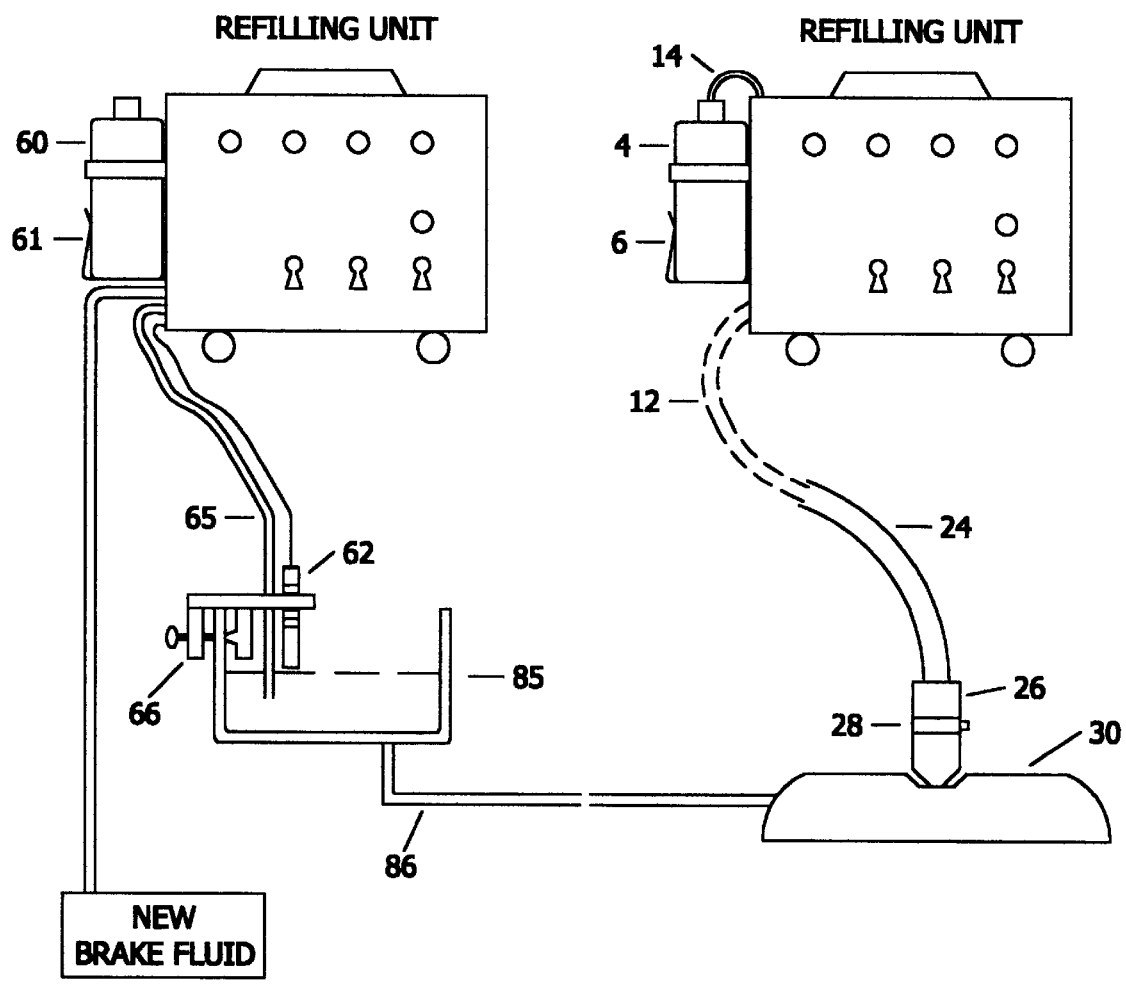
FIG. 1 is a diagrammatic view of the present invention showing the setup of the bleeding and refilling unit.

2 The bleeding unit
4 First collection container
6 Collection container holder
8 Locking castor
10 Free rolling castor
12 Inlet tubing
14 Outlet tubing
16 AC power cord
18 Inlet tubing holder
22 Door
24 Flexible hose 26 Bleeder valve adapter
28 Hose clamp
29 Axial passageway
30 Brake caliper
32 Bleeder valve
34 Opto-sensor
36 First peristaltic pump
38 First electronic beeper
40 First electronic timer
42 Second electronic timer
44 First electronic Circuit board
46 Cables from circuit board to LED displays and front panel switches
48 Power on/off switch
50 Start switch
51 Beeper on/off switch
52 Fuse
53 Power on indicator
54 Pump on indicator
55 First LED (Air bubble indicator)
56 LED (Bleeding stop indicator)

REFERENCE NUMERALS IN DRAWINGS: THE REFILLING UNIT

57 The refilling unit
58 Locking castor
59 Free rolling castor
60 Second collection container
61 Collection container holder
62 First capacitive proximity sensor
63 Second capacitive proximity sensor
64 Inlet tubing
65 Outlet tubing
66 Reservoir clamp
67 AC power cord
68 Inlet tubing holder
69 Outlet tubing and first capacitive proximity sensor cable holder
71 Door
72 Second Peristaltic pump
73 Second electronic beeper
74 Third electronic timer
75 Second electronic circuit board
76 Cables from circuit board to LED displays and front panel switches
77 Power on/off switch
78 Prime switch
79 Start switch
80 Fuse
81 Power on indicator
82 Pump on indicator
83 Third LED (reservoir fluid level indicator)
84 Second LED (flow interruption indicator)
85 Master cylinder reservoir
86 Brake line

DESCRIPTION OF THE INVENTION

Figure 2:
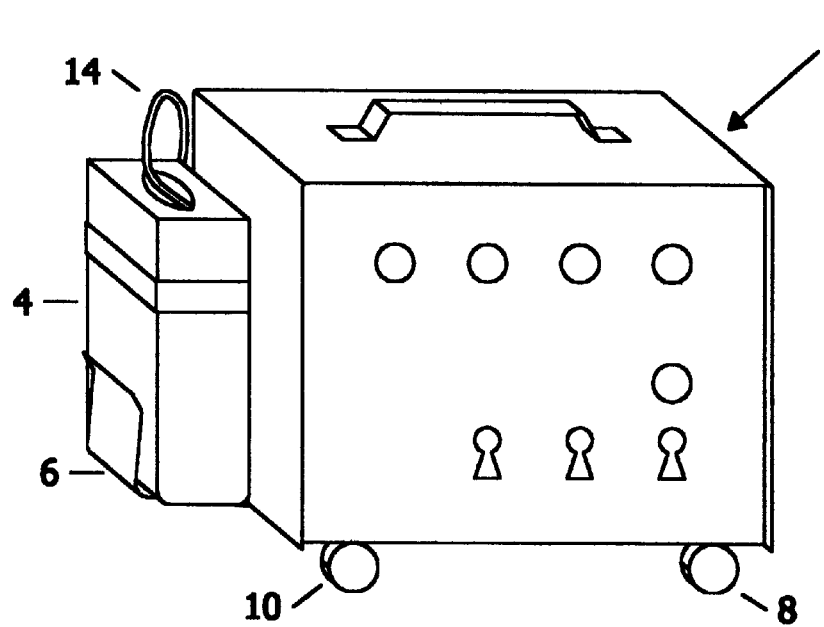
FIG. 2 is a front view in perspective of the bleeding unit showing the general appearance and the collection container.

The present invention includes a bleeding unit and a refilling unit. FIG. 2 is a front view in perspective of the bleeding unit. The enclosure of the unit consists of a cover and a base (not shown separately), A first collection container 4 for holding brake fluid removed during bleeding, is held by a container holder 6 mounted on the side of the cover.

Both the cover and the base are made of metal. Except the front panel of the base is painted black, all exposed sides are painted red. A locking castor 8 and three rolling castors 10 are mounted on the base of the enclosure.

Figure 2A:
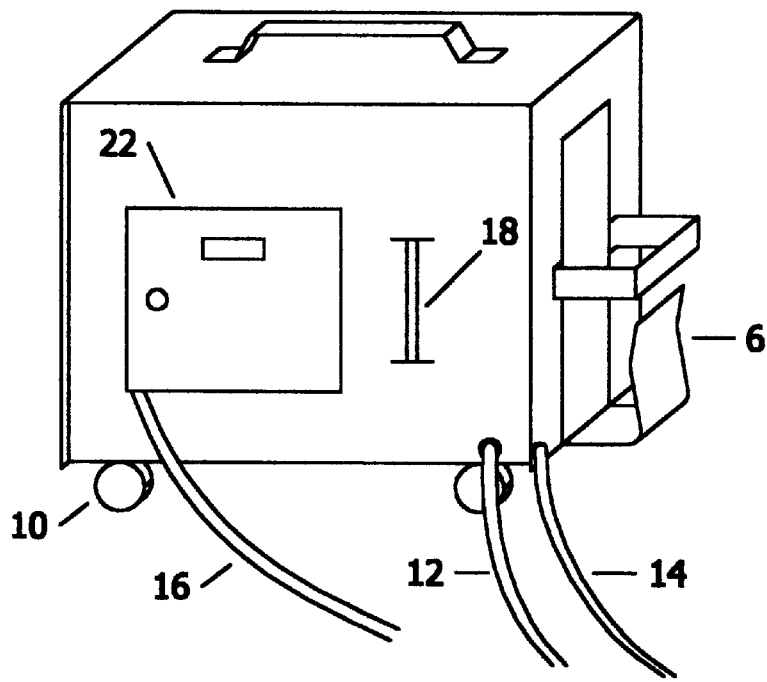
FIG. 2A is a rear view in perspective of the bleeding unit with the collection container removed.

FIG. 2A is a rear view in perspective of the bleeding unit with collection container 4 removed, showing container holder 6, also showing a door 22 to the storage compartment for a AC power cord 16. A tubing holder 18 is provided for an inlet tubing 12 when the unit is not in use. An outlet tubing 14 is inserted into collection container 4.

Figure 3B:
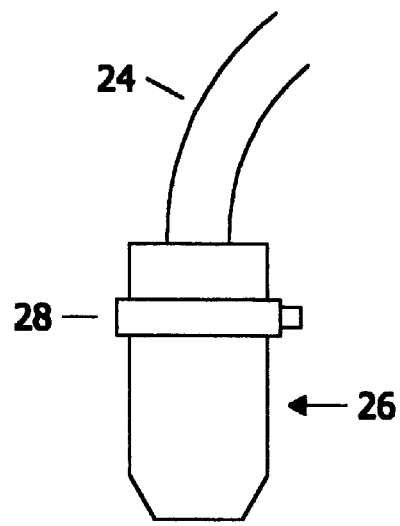
FIG. 3B is a sectional view showing the bleeder valve adapter is inserted to enclose the entire bleeder valve and the hose clamp to clamp the adapter to the hex nut of the bleeder valve.
Figure 3B:
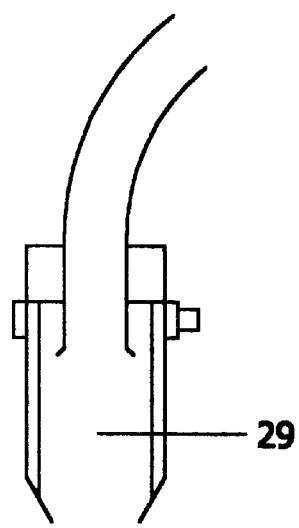
Figure 3B:
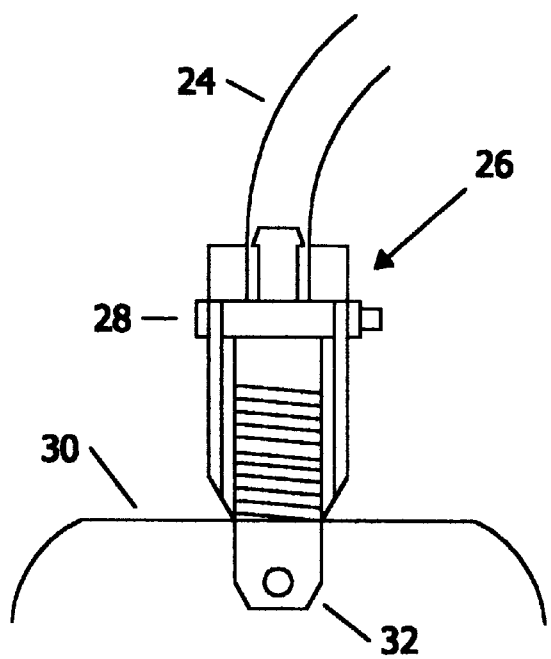

Many bleeding systems suffer from being unable to prevent air leak past the threads of the bleeder valve. FIG. 3, 3A and 3B show a bleeder valve adapter 26.

Bleeder valve adapter 26 is made of rubber, in the shape of a cylindrical body having an axial passageway 29 dimensioned to enclose a bleeder valve and a short length of flexible hose 24 at one end and terminating in conical shape at the other end. Several different size of adapters are necessary for different size bleeder valves. Bleeder valve adapter 26 is to be pushed over the bleeder valve before bleeding. A hose clamp 28 is used to clamp the adapter tightly against the hex nut of the bleeder valve so as to enclose the valve tightly and completely, the adapter is further tightened towards the brake caliper so that the conical end is sealingly compressed against the brake caliper to prevent air leak past the threads of the bleeder valve.

Figure 4:
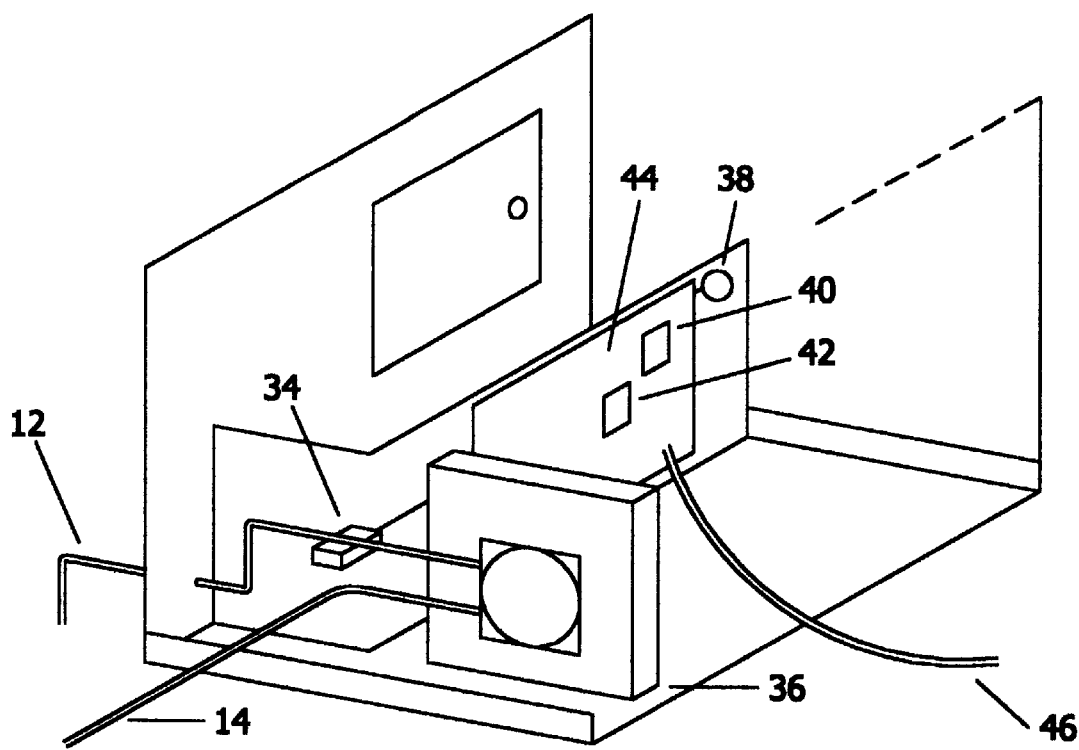
FIG. 4 is a view in perspective of the bleeding unit (the cover and front panel of the base not shown) showing arrangement of electronic components.

FIG. 4 is a view in perspective of the bleeding unit (the cover and front panel of the base not shown) showing arrangement of the electronic components.

A first electronic circuit board 44 containing the necessary electronic components for connecting and operating all electronic elements of the bleeding unit. A first peristaltic pump 36 having inlet tubing 12 and outlet tubing 14 operates on 110 VAC. One side of 110 VAC is connected to pump 36 via the normal open contacts of a relay which is controlled by two electronic timers. The free end of inlet tubing 12 is to be inserted into the free end of flexible hose 24 of the bleeder valve adapter 26 before bleeding. A cable 46 is provided for connecting LED displays and front panel switches to circuit board 44.

A first electronic timer 40 operatively connected to circuit board 44, operates pump 36 for a predetermined length of time in each bleeding sequence. An opto-sensor 34 having a recess between the emitter and the receiver serves as an air bubble detector. Inlet tubing 12 is placed in the recess of the opto-sensor. On each air bubble detected, sensor 34 outputs a signal to start a second electronic timer 42 which operates pump 36 for an additional predetermined length of time simultaneously with timer 40. The same signal from opto-sensor 34 activates a first LED 55 (light emitting diode) and a first electronic beeper 38. LED 55 flashes with each air bubble detected and beeper 38 produces audible signal to indicate the presence of each air bubble. Beeper 38 can be turned off by a switch 51 in the front panel.

Figure 4A:
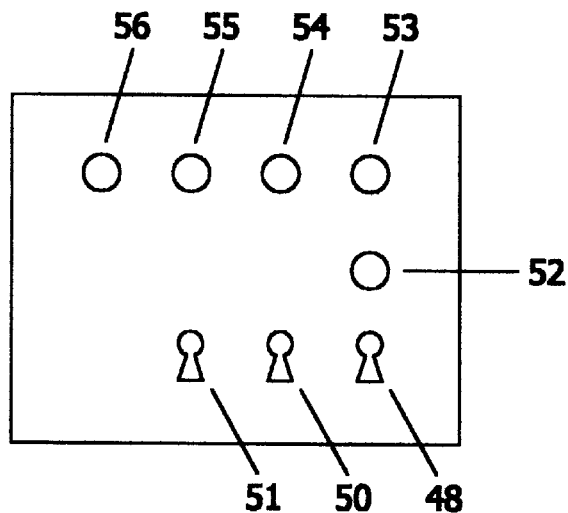
FIG. 4A is a plan view of the front panel of the bleeding unit showing the arrangement of LED displays, fuse and front panel switches.

FIG. 4A is a plan view of the front panel of the bleeding unit showing the arrangement of LED 53, 54, 55, 56, fuse 52 and panel switches 48, 50, 52.

Figure 5:
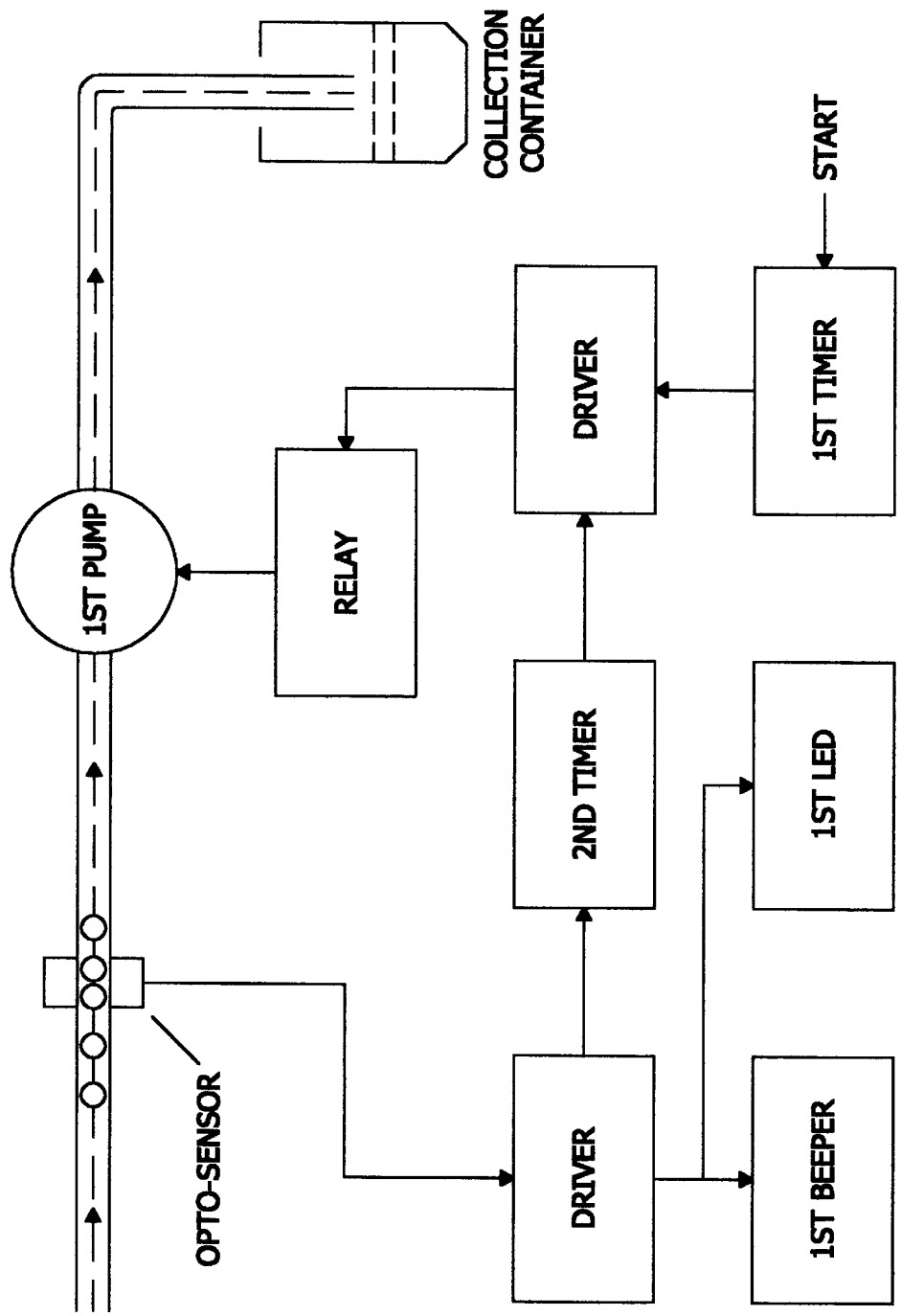
FIG. 5 is a block diagram illustrating the bleeding unit.

FIG. 5 illustrates diagrammatically the bleeding unit. When START switch 50 is pushed, a negative pulse starts first timer 40 which starts pump 36 to run for a predetermined length of time in each bleeding sequence.

This time is adjustable and calculated for pump 36 to remove all the brake fluid together with entrapped air from a master cylinder reservoir to the farthest brake caliper in the vehicle.

On each air bubble detected by opto-sensor 34, a signal is issued by sensor to start second timer 42 which operates pump 36 for an additional predetermined length of time simultaneously with first timer 40. Although, both timers operate pump 36 at the same time, the timing period of second timer 42 has no effect on the timing period of the first timer until the first timer almost reaches resetting, air bubbles detected, thereafter, will trigger the second timer to operate pump 36 until no more air bubbles are detected.

Figure 6:
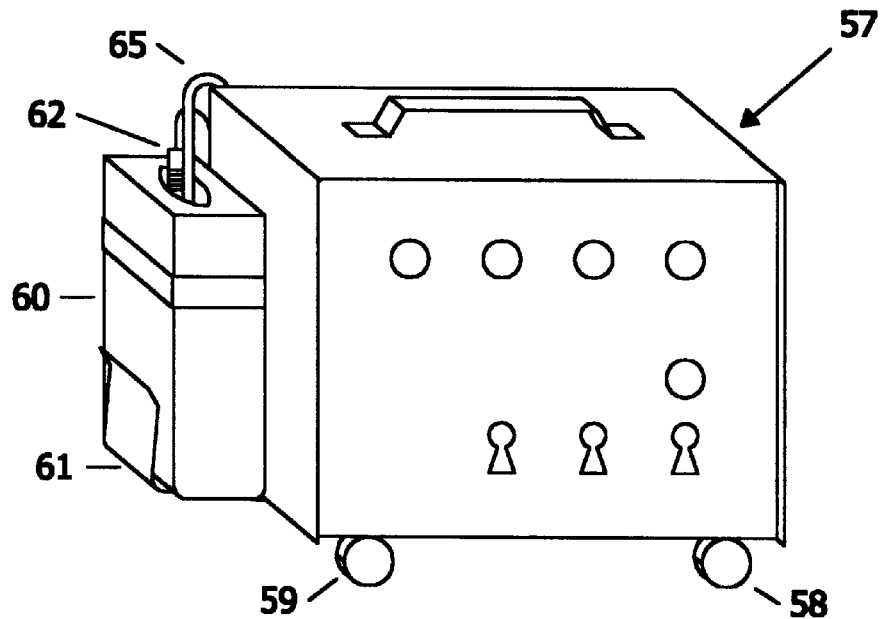
FIG. 6 is a front view in perspective of the refilling unit showing the general appearance and the collection container.

FIG. 6 is a front view in perspective of the refilling unit. A second collection container 60 serves to collect brake fluid removed from priming the unit and also serves as a holder for a first capacitive proximity sensor 62 and an outlet tubing 65 during priming and when the unit is not in use.

Figure 6A:
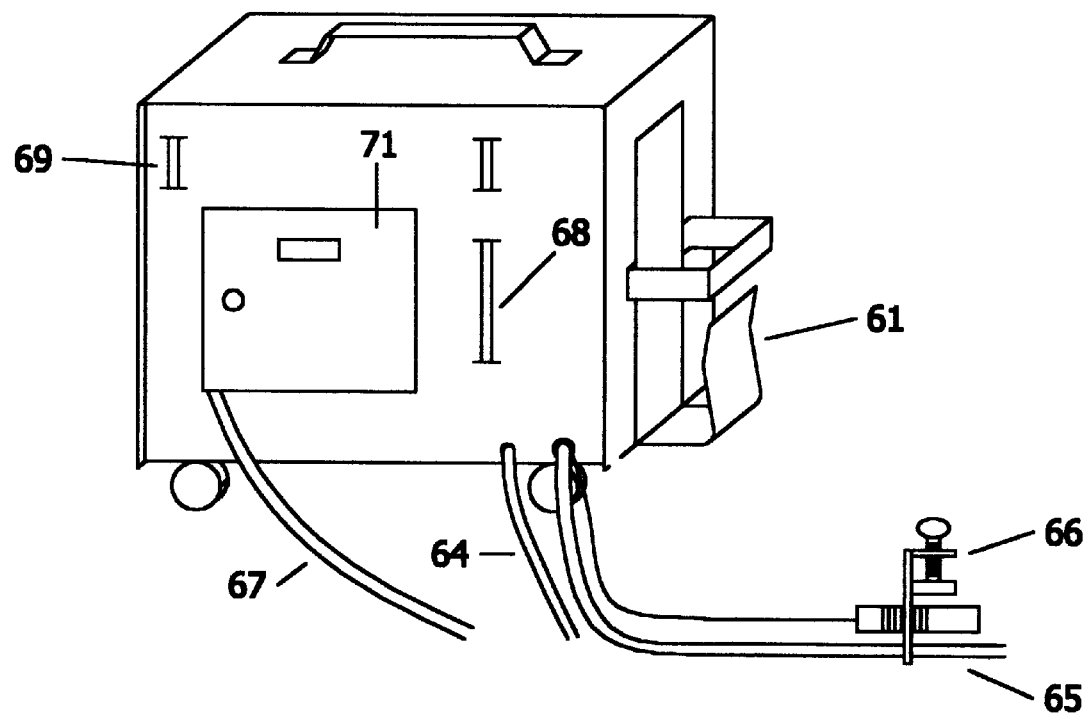
FIG. 6A is a rear view in perspective of the refilling unit with the collection container removed.
Figure 7:
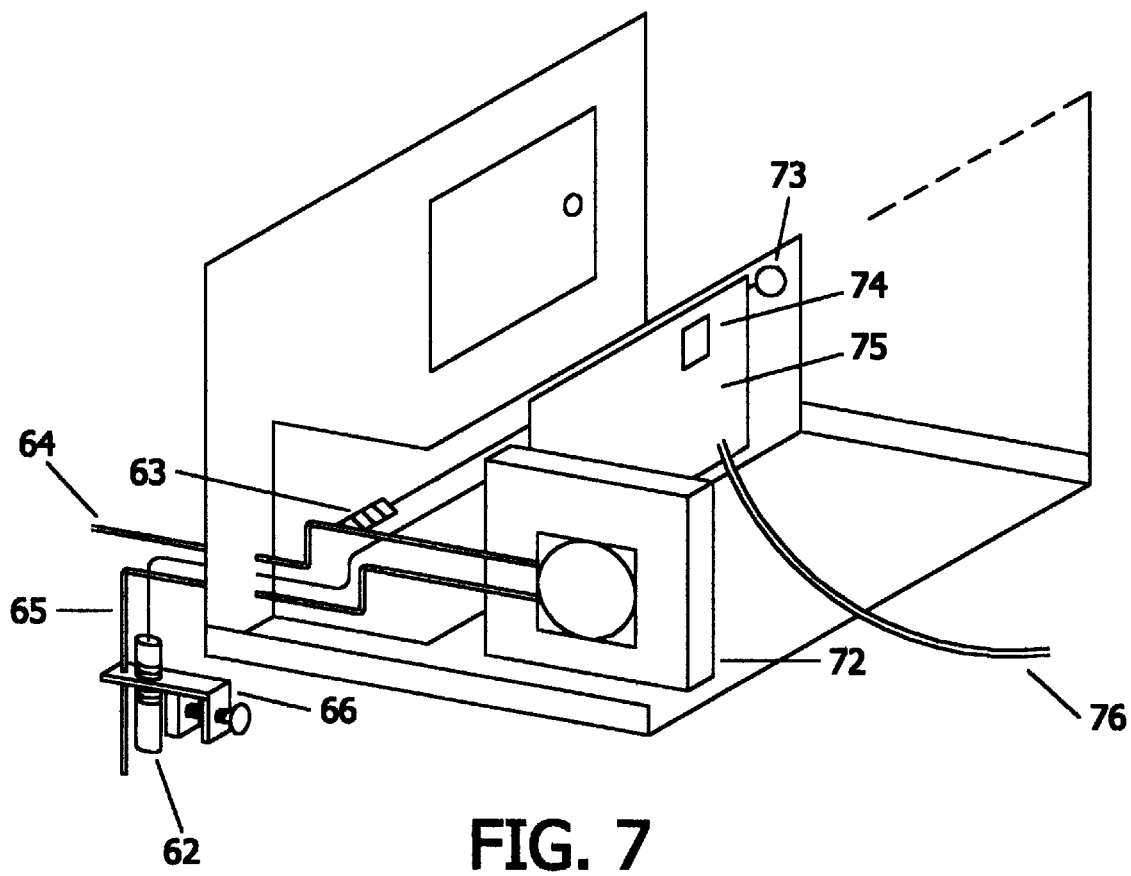
FIG. 7 is a view in perspective of the refilling unit (the cover and front panel of the base not shown) showing arrangement of electronic components.

FIG. 6A is a rear view in perspective of the refilling unit with collection container 60 removed, showing collection container holder 61. The refilling unit uses the same metal enclosure as that of the bleeding unit, except the front panel of the base is painted blue and a tubing holder 69 is provided for an outlet tubing 65 and the cable of first capacity proximity sensor 62 when the unit is not in use. FIG. 7 is a view in perspective of the refilling unit (the cover and front panel of the base not shown) showing arrangement of the electronic elements.

A second electronic circuit board 75 contains the electronic components for operating the refilling unit.

A second peristaltic pump 72 having an inlet tubing 64 and an outlet tubing 65 operates on 110 VAC. One side of 110 VAC to pump 72 is connected to the normal open contacts of a relay which is controlled by a second electronic timer 74 and the output signals of first capacitive sensor 62.

Figure 7A:
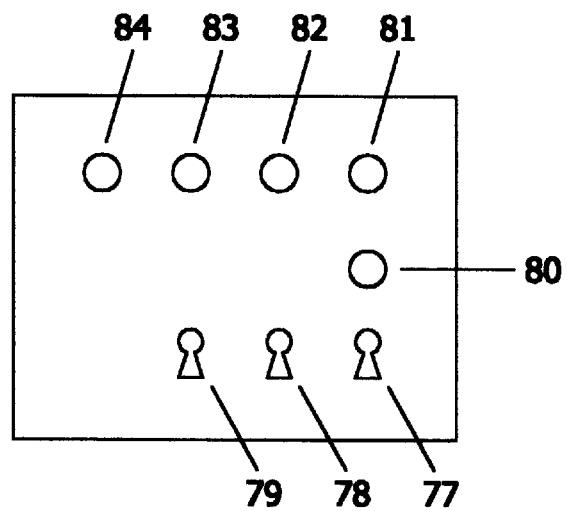
FIG. 7A is a plan view of the front panel of the refilling unit showing the arrangement of LED displays, fuse and front panel switches.

FIG. 7A is a plan view of the front panel of the refilling unit showing arrangement of LED displays 83, 84, 85, 86, fuse 80 and front panel switches 77, 78, 79.

Figure 8:
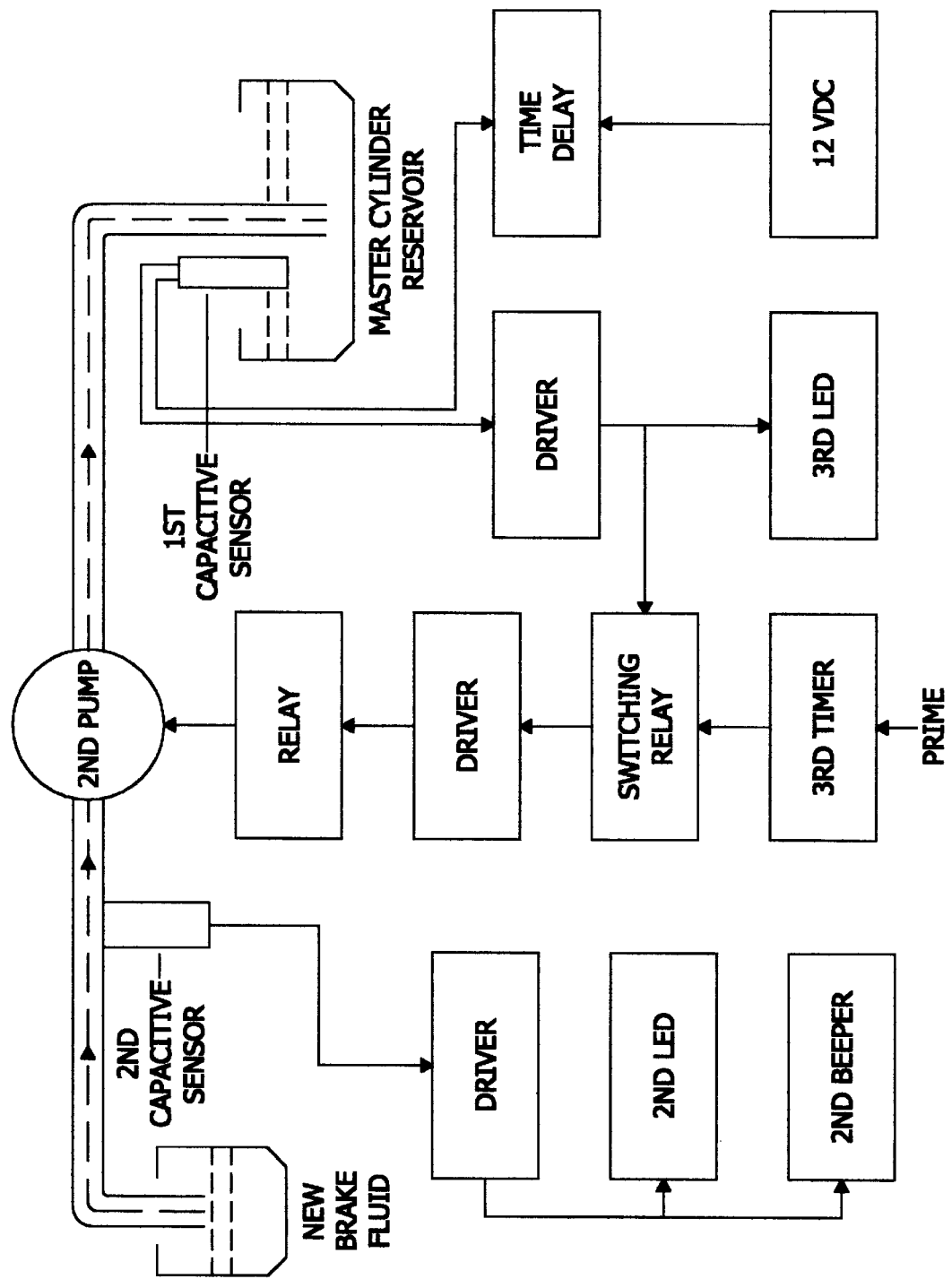
FIG. 8 is a block diagram illustrating the refilling unit.

FIG. 8 illustrates diagrammatically the refilling unit. Inlet tubing 64 should be inserted into a source of new brake fluid in its original container to prevent contamination. When PRIME switch 78 is pushed, a negative pulse starts electronic timer 74 which energizes a switching relay resulting pump 72 starts to run for a predetermined length of time so that entrapped air and brake fluid left in inlet tubing 64 and outlet tubing 65 from the last refilling operation are drained through the outlet tubing into collection container 60.

As soon as timer 74 resets and the refilling unit is primed, the switching relay is released to reconnect pump 72 to first capacitive proximity sensor. First capacitive proximity sensor 62 and outlet tubing 65 holding by reservoir clamp 66 is clamped to the master cylinder reservoir. When START switch 79 is turned on, 12 VDC is supplied to a time delay circuit (not shown) which delays for a predetermined length of time before first capacitive proximity sensor 62 becomes operative. Sensor 62 serves as a fluid level controller. The slight delay prevents pump 72 from pulsing.

A third LED 83 operatively connected to first capacitive proximity sensor 62 via circuit board 75 will light to indicate the brake level in the master cylinder reservoir is up to the level set by sensor 62.

Low brake fluid level or entrapped air causes flow interruption. A second capacitive proximity sensor 63 is attached to inlet tubing 64. Sensor 63 serves as a flow detector, which outputs a signal to light a second LED 84 and to activate a second electronic beeper 73 to indicate flow interruption.

OPERATION OF THE INVENTION

FIG. 1 illustrates diagrammatically the setup of the bleeding unit and the refilling unit in use.

a) Locate the refilling unit close to the master cylinder reservoir of the vehicle.

b) Insert inlet tubing 64 into a source of new brake fluid. Clamp reservoir clamp 66 which holds outlet tubing 65 and first capacitive proximity sensor 62 to collection container 60, plug AC power cord 67 into a grounded 110 VAC outlet and turn on POWER switch 77. Power on is indicated by LED 81.

c) Push PRIME switch 78, priming will start immediately. LED 82 blinks to indicate the pump 72 is running. When priming stops, remove reservoir clamp from the collection container, then clamp the reservoir clamp to the master cylinder reservoir, raise or lower sensor 62 to the desired level if necessary.

d) Turn on START switch 79, the refilling unit is now ready.

e) Move the bleeding unit close to the brake caliper to be bled first, plug AC power cord 16 into a 110 VAC grounded outlet.

f) Loosen the bleeder valve approximately 3 to 4 turns, push bleeder valve adapter 26 into the bleeder valve until the conical end of the adapter comes in contact with the brake caliper, use hose clamp 28 to clamp the adapter to the hex nut of the bleeder valve, then further tighten the adapter towards the brake caliper until the conical end of the adapter is sealingly compressed against the brake caliper body to prevent air leak.

g) Insert the free end of inlet tubing 12 into the free end of flexible hose 24 of the bleeder valve adapter, turn on Power switch 48, LED 53 will lights to indicate that power is on, turn on START switch 50, LED 54 will blink to indicate bleeding is started. Monitor by the flashing of LED 55 and listen to the audible signals from electronic beeper 38 as air bubbles are being removed. If LED 55 flashes and the beeper sounds at fixed intervals for approximately a minute, it indicates that air leak exists in the hydraulic system.

h) LED 56 will light when bleeding is completed. Loosen hose clamp 28, then remove the bleeder valve adapter from the bleeder valve and tighten the valve.

SUMMARY, RAMIFICATIONS AND SCOPES

Accordingly, the reader will see that in combination, the bleeding unit and the refilling unit of the present invention accomplish the bleeding and refilling of hydraulic brake systems, particularly, automotive hydraulic brake systems conveniently, efficiently and automatically.

Although the description above contains many specificities, these should not be construed as limiting the scope of the invention but as merely providing illustrations of the presently preferred embodiment of this invention. For example, a) The opto-sensor can be replaced with capacitive or ultrasound sensing devices for air bubble detection.

b) Conventional gear pump meeting the required specifications can be used.

c) Moving type of LED display can be used to create a display of air bubbles in motion while being removed.

d) The bleeding and the refilling unit can be changed to different sizes, shapes and colors.

e) The bleeding and the refilling unit can be placed in a rack on wheels for vehicles to be serviced above the floor.

f) The bleeding unit and the refilling unit can be modified for other use, for example, in bleeding hydraulic clutches, fluid flow detection and as fluid delivering device.

Thus the scope of the invention should be determined by the appended claims and their legal equivalent, rather than by the example given.

We claim:

1. Apparatus for bleeding and refilling hydraulic brake system includes a bleeding unit and a refilling unit, the bleeding unit, comprising:

a) a bleeder valve adapter made of rubber, in the shape of an cylindrical body having an axial passageway dimensioned to enclose a bleeder valve and a short length of flexible hose at one end and terminating in conical shape at the other end, during bleeding an automotive brake caliper, said adapter is to be pushed over the bleeder valve so as to enclose the valve completely, a hose clamp is used to tighten said adapter to the hex nut of the bleeder valve, and said adapter is further tightened towards the brake caliper, providing sealing means for preventing air leak past the threads of the bleeder valve, b) a first electronic circuit board provides means for operating the bleeding unit, c) a first peristaltic pump having an inlet tubing and an outlet tubing, provides suction means for removing brake fluid and entrapped air in the hydraulic system, d) a first electronic timer provides means for operating said first pump for a predetermined length of time in each bleeding sequence, e) an opto-sensor disposed at the inlet tubing, provides means for detecting entrapped air bubbles in a hydraulic system and to output a signal on each air bubble detected, f) a second electronic timer operated by the output signal of said opto-sensor, provides means for operating said first pump for an additional amount of predetermined length of time on each air bubble detected, g) a first LED controlled by the signal of said opto-sensor, provides means for displaying the presence of each air bubble detected, h) a first electronic beeper operated by the signal of said opto-sensor, provides means for producing audible signals to indicate each air bubble detected, i) a first collection container mounted on the side of the bleeding unit, provides means for holding brake fluid removed during bleeding, the refilling unit, comprising:

j) a second electronic circuit board provides means for operating the refilling unit, k) a second peristaltic pump having an inlet and an outlet tubing, provides suction means for refilling a master reservoir with new brake fluid during bleeding, l) a third electronic timer provides means for operating said second pump for a predetermined length of time so as to prime the refilling unit before refilling, m) a first capacitive proximity sensor holding by a reservoir clamp and operatively connected to said second pump, provides means for detecting brake fluid level so as to maintain the brake fluid level in a master cylinder reservoir during bleeding, n) a second capacitive proximity sensor disposed at the inlet tubing, provides means for producing signals to indicate flow interruption of new brake fluid to a master cylinder reservoir caused by entrapped air or low fluid level, o) a second LED controlled by the output signal of said second sensor, provides means for indicating flow interruption, p) a second electronic beeper operated by the output signal of said second sensor provides means for producing audible signals to indicate flow interruption, q) a third LED controlled by the output signal of said first capacitive proximity sensor, provides means for indicating the brake fluid level in a master cylinder reservoir during bleeding, r) a second collection container mounted on the side of the refilling unit, provides means for holding brake fluid removed during priming of the refilling unit, whereby the flashing of said first LED and beeping signals from said first electronic beeper indicate each air bubble is being removed, and each air bubble while being removed extends the operating time of said first pump so that said first pump will continue to run until no more air bubbles are detected, resulting that a hydraulic brake system is bled automatically, and whereby a master cylinder reservoir is automatically refilled during bleeding, in combination, the bleeding unit and the refilling unit of the present invention bleeds and refills automotive hydraulic brake systems conveniently, efficiently and automatically.

* * * * *